United States Patent
Hasegawa

(10) Patent No.: US 10,218,019 B2
(45) Date of Patent: Feb. 26, 2019

(54) METHOD OF DETERMINING HYDROGEN DEFICIENCY AND DEVICE FOR DETERMINING HYDROGEN DEFICIENCY

(71) Applicant: TOYOTA JIDOSHA KABUSHIKI KAISHA, Toyota-shi, Aichi-ken (JP)

(72) Inventor: Takahiko Hasegawa, Toyota-shi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 36 days.

(21) Appl. No.: 15/477,167

(22) Filed: Apr. 3, 2017

(65) Prior Publication Data
US 2017/0294667 A1   Oct. 12, 2017

(30) Foreign Application Priority Data
Apr. 7, 2016 (JP) ................................ 2016-077297

(51) Int. Cl.
| | |
|---|---|
| *G01R 27/08* | (2006.01) |
| *H01M 8/04992* | (2016.01) |
| *H01M 8/0444* | (2016.01) |
| *H01M 8/04537* | (2016.01) |

(52) U.S. Cl.
CPC ... *H01M 8/04992* (2013.01); *H01M 8/04447* (2013.01); *H01M 8/04559* (2013.01); *H01M 8/04589* (2013.01); *H01M 8/04641* (2013.01); *H01M 8/04649* (2013.01)

(58) Field of Classification Search
CPC ......... H01M 8/04992; H01M 8/04589; H01M 8/04447; H01M 8/04559; H01M 8/04649; H01M 8/04641; H01M 8/04671; H01M 8/04634; H01M 8/04126; H01M 8/04828
See application file for complete search history.

(56) References Cited

U.S. PATENT DOCUMENTS

| | | | | |
|---|---|---|---|---|
| 7,122,263 | B2* | 10/2006 | Imamura | ............ H01M 8/04119 429/413 |
| 8,728,672 | B2* | 5/2014 | Ishikawa | ........... H01M 8/04126 429/413 |
| 2007/0184314 | A1* | 8/2007 | Kagami | ............ H01M 8/04156 429/431 |

(Continued)

FOREIGN PATENT DOCUMENTS

| | | |
|---|---|---|
| JP | 2012-252986 A | 12/2012 |
| JP | 2013-125604 A | 6/2013 |
| WO | WO 2010/128555 A1 | 11/2010 |

*Primary Examiner* — Thang X Le
(74) *Attorney, Agent, or Firm* — Finnegan, Henderson, Farabow, Garrett & Dunner, LLP

(57) ABSTRACT

A method of determining hydrogen deficiency of a fuel cell having a plurality of cell groups includes a reference value storage step of storing, as a reference value, a value of impedance in a state where hydrogen-off gas is discharged from the fuel cell and hydrogen gas and oxidant gas are supplied, a measured value calculation step of calculating a measured value of impedance based on a voltage of the cell groups and a current of the fuel cell, a corrected value calculation step of calculating a corrected value of impedance by correcting the measured value based on the reference value, and a determination step of determining that hydrogen deficiency occurs in a case where the corrected value exceeds a predetermined threshold.

5 Claims, 3 Drawing Sheets

(56) References Cited

U.S. PATENT DOCUMENTS

| | | | |
|---|---|---|---|
| 2009/0110985 A1* | 4/2009 | Manabe | H01M 8/04089 |
| | | | 429/492 |
| 2012/0038373 A1 | 2/2012 | Ikeda et al. | |
| 2013/0057292 A1* | 3/2013 | Hasegawa | H01M 8/04559 |
| | | | 324/430 |
| 2014/0162151 A1* | 6/2014 | Mohri | H01M 8/04835 |
| | | | 429/413 |

* cited by examiner

METHOD OF DETERMINING HYDROGEN DEFICIENCY AND DEVICE FOR DETERMINING HYDROGEN DEFICIENCY

INCORPORATION BY REFERENCE

The disclosure of Japanese Patent Application No. 2016-077297 filed on Apr. 7, 2016 including the specification, drawings and abstract is incorporated herein by reference in its entirety.

BACKGROUND

1. Technical Field

The disclosure relates to a method of determining hydrogen deficiency and a device for determining hydrogen deficiency.

2. Description of Related Art

At present, a fuel cell which receives supply of reactant gas (fuel gas and oxidant gas) to perform electric power generation has put into practical use. The fuel cell is an electric power generation system which oxidizes fuel through an electrochemical process to directly convert energy discharged with the oxidation reaction to electric energy. The fuel cell has a membrane-electrode assembly in which a polymer electrolyte membrane for selectively transporting hydrogen ions is sandwiched by a pair of electrodes (anode electrode and cathode electrode) made of porous materials on both side surfaces, and each electrode has a catalyst layer which promotes an electrochemical reaction.

In such a fuel cell, if hydrogen is deficient in the anode electrode during electric power generation, the catalyst is deteriorated. For this reason, means (method) for determining the presence or absence of hydrogen deficiency in the fuel cell is required. In recent years, a hydrogen concentration estimation method which estimates a hydrogen concentration to be relatively low when a measured impedance semicircle is relatively large using the correlation relationship between the impedance semicircle of the fuel cell and the hydrogen concentration in the fuel cell was proposed (for example, see International Publication No. 2010/128555 (WO 2010/128555 A)).

SUMMARY

On the other hand, in a case where a negative potential is generated due to hydrogen deficiency in the fuel cell, it is known that the amount of change in low-frequency impedance is greater than the amount of change in cell voltage (a voltage of a plurality of cell groups constituting the fuel cell), and a method which monitors the presence or absence of hydrogen deficiency in the fuel cell using this relationship has been studied. If such a method is employed, it is possible to increase the number of cells to be monitored simultaneously; however, the influence of a measurement error (an offset error depending on an individual) due to an increase in measurement range increases, and there is a problem in that measurement accuracy is degraded.

The disclosure provides a method of determining hydrogen deficiency capable of increasing the number of cells to be monitored simultaneously without causing degradation of measurement accuracy.

A first aspect of the disclosure relates to a method of determining hydrogen deficiency of a fuel cell having a plurality of cell groups. The method includes storing, as a reference value, an impedance value in a state where hydrogen-off gas is discharged from the fuel cell and hydrogen gas and oxidant gas are supplied, calculating a measured value of impedance based on a voltage of the cell groups and a current of the fuel cell, calculating a corrected value of impedance by correcting the measured value based on the reference value, and determining that hydrogen deficiency occurs in a case where the corrected value exceeds a predetermined threshold.

A second aspect of the disclosure relates to a device for determining hydrogen deficiency of a fuel cell having a plurality of cell groups. The device for determining hydrogen deficiency includes a reference value storage unit configured to store, as a reference value, an impedance value in a state where hydrogen-off gas is discharged from the fuel cell and hydrogen gas and oxidant gas are supplied, a measured value calculation unit configured to calculate a measured value of impedance based on a voltage of the cell groups and a current of the fuel cell, a corrected value calculation unit configured to calculate a corrected value of impedance by correcting the measured value based on the reference value, and a determination unit configured to determine that hydrogen deficiency occurs in a case where the corrected value exceeds a predetermined threshold.

A third aspect of the present disclosure relates to a device for determining hydrogen deficiency of a fuel cell having a plurality of cell groups. The device comprises an electronic control unit that stores, as a reference value, an impedance value in a state where hydrogen-off gas is discharged from the fuel cell and hydrogen gas and oxidant gas are supplied and programmed to calculate a measured value of impedance based on a voltage of the cell groups and a current of the fuel cell, to calculate a corrected value of impedance by correcting the measured value based on the reference value, and to determine that hydrogen deficiency occurs in a case where the corrected value exceeds a predetermined threshold.

According to the first, second and third aspects, it is possible to suppress the decrease of measurement accuracy based on a measurement error (an offset error depending on an individual) due to an increase in measurement range. Therefore, it is possible to determine the presence or absence of hydrogen deficiency using impedance, and it is possible to increase the number of cells to be monitored simultaneously. Namely, it is possible to determine whether or not hydrogen deficiency occurs by storing, as the reference value, the impedance value in a state where hydrogen deficiency does not occur (a state where hydrogen-off gas is discharged from the fuel cell and hydrogen gas and oxidant gas are supplied) and comparing the corrected value obtained by correcting the measured value of impedance using the reference value with the predetermined threshold. For this reason, it is possible to reduce a measurement error (an offset error depending on an individual) due to an increase in measurement range. Therefore, it is possible to increase the number of cells to be monitored simultaneously without causing degradation of measurement accuracy.

In the first aspect of the disclosure, the corrected value may be calculated by adding a value obtained by subtracting the reference value from a nominal value of impedance to the measured value.

In the second aspect of the disclosure, the corrected value calculation unit may be configured to calculate the corrected value by adding a value obtained by subtracting the reference value from a nominal value of impedance to the measured value.

According to the disclosure, it is possible to provide a method of determining hydrogen deficiency capable of increasing the number of cells to be monitored simultaneously without causing degradation of measurement accuracy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
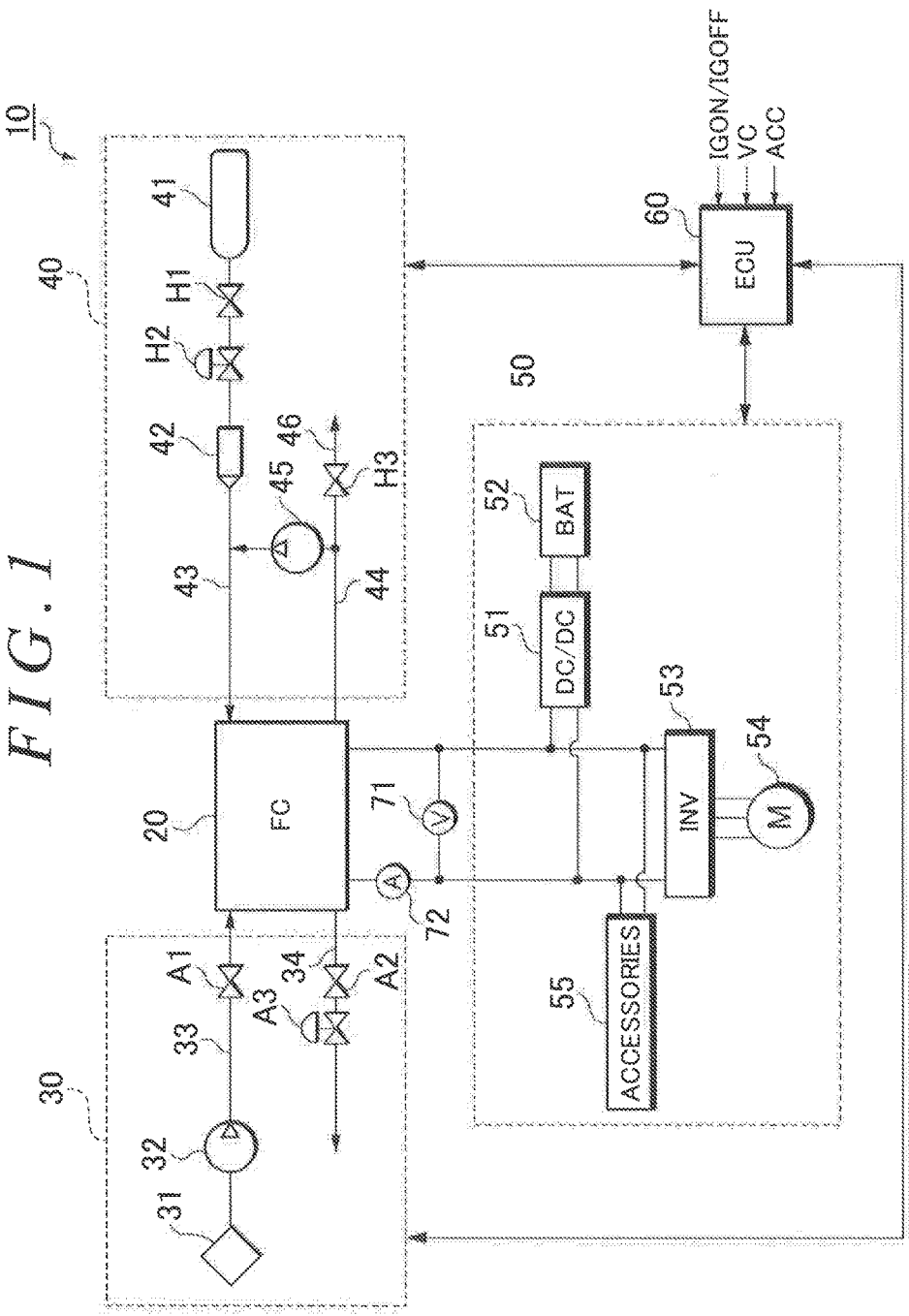
FIG. 1 is an explanatory view showing the outline of the configuration of a fuel cell system according to an embodiment of the disclosure.

Hereinafter, an embodiment of the disclosure will be described referring to the drawings. The positional relationships, such as up, down, right, and left, of the drawings are based on the positional relationships shown in the drawings unless otherwise specified. The dimension ratios of the drawings are not limited to the ratios shown in the drawings. In addition, the following embodiment is an example for describing the disclosure, and the disclosure is not intended to be limited to the embodiment. Furthermore, various modifications can be made as long as the modifications do not depart from the scope of the disclosure.

First, the configuration of a fuel cell system 10 according to this embodiment will be described referring to FIG. 1. The fuel cell system 10 functions as, for example, an in-vehicle electric power supply system which is mounted in a fuel cell vehicle as a moving object, and includes a fuel cell 20 which receives supply of reactant gas (fuel gas and oxidant gas) to generate electric power, an oxidant gas supply system 30 which supplies air as oxidant gas to the fuel cell 20, a fuel gas supply system 40 which supplies hydrogen gas as fuel gas to the fuel cell 20, an electric power system 50 which controls charging and discharging of electric power, and a controller 60 which integrally controls the entire system.

The fuel cell 20 is a solid polymer electrolyte cell stack in which multiple cells are laminated in series. In the fuel cell 20, an oxidation reaction represented by Formula (1) occurs on an anode electrode, and a reduction reaction represented by Formula (2) occurs on a cathode electrode. An electromotive reaction represented by Formula (3) occurs as the whole of the fuel cell 20.

$$H_2 \rightarrow 2H+ +2e- \tag{1}$$

$$(1/2)O_2 + 2H+ +2e- \rightarrow H_2O \tag{2}$$

$$H_2 + (1/2)O_2 \rightarrow H_2O \tag{3}$$

Each cell constituting the fuel cell 20 has a polymer electrolyte membrane, an anode electrode, a cathode electrode, and separators. The anode electrode and the cathode electrode form a sandwich structure with the polymer electrolyte membrane sandwiched from both sides. The separators are constituted of gas impermeable conductive members, and respectively form flow passages of fuel gas and oxidant gas between the anode electrode and the cathode electrode while sandwiching the anode electrode and the cathode electrode from both sides.

Each of the anode electrode and the cathode electrode has a catalyst layer and a gas diffusion layer. The catalyst layer has catalyst-supported carbon functioning as a catalyst with, for example, platinum-based noble metal particles supported thereon, and a polymer electrolyte. As a material of the platinum system of the noble metal particles, for example, metal catalysts (Pt, Pt—Fe, Pt—Cr, Pt—Ni, Pt—Ru, and the like) can be used. As the catalyst-supported carbon, for example, carbon black can be used. As the polymer electrolyte, proton conductor ion change resin or the like can be used. The gas diffusion layer is formed on the surface of the catalyst layer to have air permeability and electronic conductivity, and is formed of carbon cloth, carbon paper, or carbon felt formed of threads of carbon fiber.

The polymer electrolyte membrane is a proton conductive ion exchange membrane formed of a solid polymer material, for example, fluorine-based resin, and exhibits satisfactory electric conductivity in a wet state. The polymer electrolyte membrane, the anode electrode, and the cathode electrode form a membrane-electrode assembly.

As shown in FIG. 1, a voltage sensor 71 which detects a voltage of a plurality of cell groups constituting the fuel cell 20, and a current sensor 72 which detects a current of the fuel cell 20 are attached to the fuel cell 20. The voltage and the current detected by the voltage sensor 71 and the current sensor 72 are used for calculation of impedance described below.

The oxidant gas supply system 30 has an oxidant gas flow passage 33 in which oxidant gas supplied to the cathode electrode of the fuel cell 20 flows, and an oxidation-off gas flow passage 34 in which oxidation-off gas discharged from the fuel cell 20 flows. The oxidant gas flow passage 33 is provided with an air compressor 32 which takes an oxidant gas from atmosphere through a filter 31, and a shutoff valve A1 which shuts off supply of oxidant gas to the fuel cell 20. The oxidation-off gas flow passage 34 is provided with shutoff valve A2 which shuts off discharge of oxidation-off gas from the fuel cell 20, and a backpressure regulator valve A3 which regulates an oxidant gas supply pressure.

The fuel gas supply system 40 has a fuel gas supply source 41, a fuel gas flow passage 43 in which fuel gas supplied from the fuel gas supply source 41 to the anode electrode of the fuel cell 20 flows, a circulation flow passage 44 which circulates fuel-off gas discharged from the fuel cell 20 to the fuel gas flow passage 43, a circulation pump 45 which pumps fuel-off gas in the circulation flow passage 44 to the fuel gas flow passage 43, and an exhaust/drain flow passage 46 which branches off from the circulation flow passage 44.

The fuel gas supply source 41 is constituted of, for example, a high-pressure hydrogen tank, a hydrogen absorbing alloy, or the like, and stores hydrogen gas at high pressure (for example, 35 MPa to 70 MPa). If a shutoff valve H1 is opened, fuel gas flows from the fuel gas supply source 41 to the fuel gas flow passage 43. Fuel gas is reduced in pressure to, for example, about 200 kPa by a regulator H2 or an injector 42 and is supplied to the fuel cell 20.

The exhaust/drain flow passage 46 branches off from the circulation flow passage 44, and the exhaust/drain flow passage 46 is provided with an exhaust/drain valve H3. The exhaust/drain valve H3 is operated according to a command from the controller 60 to discharge fuel-off gas and moisture containing impurities in the circulation flow passage 44 to the outside.

Fuel-off gas discharged through the exhaust/drain valve 113 is mixed with oxidation-off gas flowing in the oxidation-off gas flow passage 34, and is diluted by a diluter (not shown). The circulation pump 45 circulates and supplies fuel-off gas in a circulation system to the fuel cell 20 through a motor drive.

The electric power system 50 has a DC/DC converter 51, a battery 52, a traction inverter 53, a traction motor 54, and accessories 55. The DC/DC converter 51 has a function of boosting a DC voltage supplied from the battery 52 and outputting the resultant DC voltage to the traction inverter 53, and a function of deboosting DC, electric power generated by the fuel cell 20 or regenerative electric power collected by the traction motor 54 through regenerative braking and charging the battery 52 with the resultant electric power.

The battery 52 functions as a storage source of surplus electric power, a regenerative energy storage source at the time of regenerative braking, an energy buffer at the time of a load fluctuation with acceleration or deceleration of the fuel cell vehicle, or the like. As the battery 52, for example, a secondary battery, such as a nickel-cadmium storage battery, a nickel-hydrogen storage battery, or a lithium secondary battery, is suitably used.

The traction inverter 53 is a PWM inverter which is driven, for example, by a pulse-width modulation system, and converts a DC voltage output the fuel cell 20 or the battery 52 to a three-phase AC voltage according to a control command from the controller 60, thereby controlling rotation torque of the traction motor 54. The traction motor 54 is, for example, a three-phase AC motor, and constitutes a power source of the fuel cell vehicle.

The accessories 55 collectively refer to respective motors provided in the respective units of the fuel cell system 10, inverters for driving these motors, and various in-vehicle accessories (for example, the air compressor 32, the injector 42, the circulation pump 45, a radiator, a cooling water circulation pump, and the like).

The controller 60 is a computer system including a CPU, a ROM, a RAM, and an input/output interface, and controls the respective units of the fuel cell system 10. For example, if a start signal IC output from an ignition switch is received, the controller 60 starts the operation of the fuel cell system 10, and calculates required electric power of the entire system based on an accelerator pedal angle signal ACC output from an accelerator sensor, a vehicle speed signal VC output from a vehicle speed sensor, or the like. The requited electric power of the entire system is a total value of vehicle traveling electric power and accessory electric power.

The accessory electric power includes electric power which is consumed in the in-vehicle accessories (the air compressor 32, the circulation pump 45, the cooling water circulation pump, and the like), electric power which is consumed in devices (a transmission, a wheel control device, a steering device, a suspension device, and the like), electric power which is consumed in devices (an air conditioner, lighting devices, audio, and the like) provided in an occupant space, and the like.

The controller 60 determines distribution of output electric power of each of the fuel cell 20 and the battery 52, controls the oxidant gas supply system 30 and the fuel gas supply system 40 such that the amount of generated electric power of the fuel cell 20 matches target electric power, and controls the DC/DC converter 51 to regulate the output voltage of the fuel cell 20, thereby controlling the operation point (output voltage and output current) of the fuel cell 20.

At the time of the operation of the fuel cell system 10, in the fuel cell 20, as represented in Formula (1) described above, hydrogen ions generated on the anode electrode are permeated through the electrolyte membrane and moved to the cathode electrode, and the hydrogen ions moved to the cathode electrode undergo an electrochemical reaction with oxygen in oxidant gas supplied to the cathode electrode as represented in Formula (2) described above and cause a reduction reaction of oxygen to venerate water.

Figure 2:
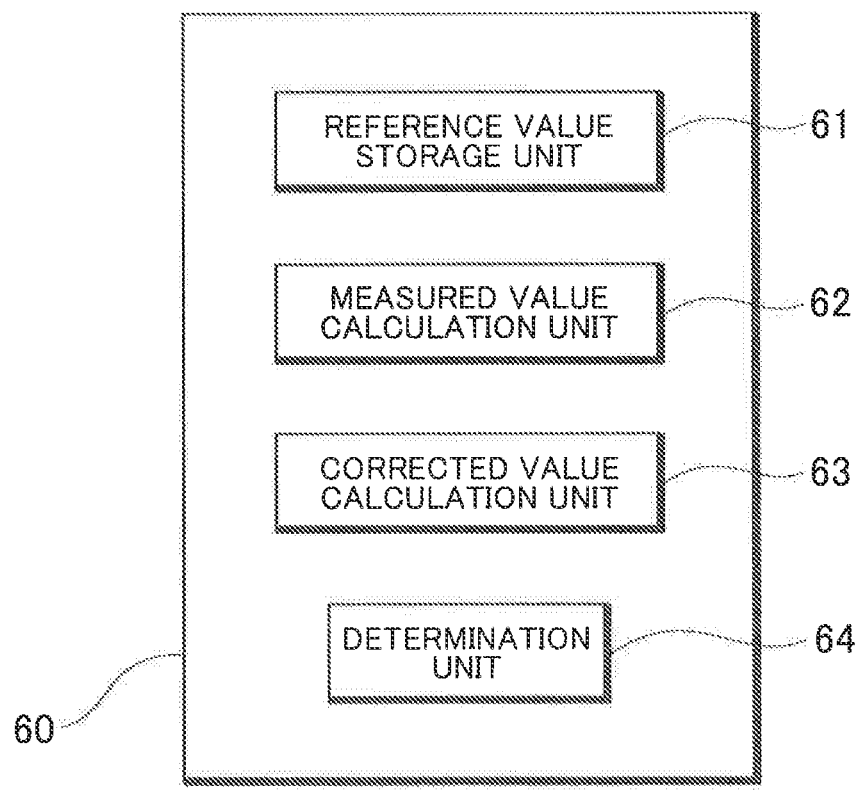
FIG. 2 is a block diagram illustrating the functional configuration of a controller of the fuel cell system according to the embodiment of the disclosure.

The controller 60 functions so as to determine hydrogen deficiency of the fuel cell 20. That is, the controller 60 can be regarded as a device for determining hydrogen deficiency in the disclosure. FIG. 2 is a block diagram illustrating the configuration of the controller 60 which functions as a device for determining hydrogen deficiency.

The controller 60 has a reference value storage unit 61 which stores, as a reference value $\alpha$, an impedance value in a state where hydrogen-off gas is discharged from the fuel cell 20 and hydrogen gas and oxidant gas are supplied (a reference state where hydrogen deficiency does not occur: a state where purging of hydrogen-off gas is completed and hydrogen and oxygen are supplied in an amount for required electric power). The controller 60 controls the respective valves provided in the fuel gas supply system 40 to create the reference state where hydrogen deficiency does not occur. That is, the controller 60 controls the exhaust/drain valve H3 to discharge hydrogen-off gas or moisture from the fuel cell 20 through the exhaust/drain flow passage 46 and the circulation flow passage 44, controls the shutoff valve H1, the regulator H2, and the injector 42 to supply hydrogen gas to the fuel cell 20 through the fuel gas flow passage 43, and controls the air compressor 32 to supply oxidant gas to the fuel cell 20 through the oxidant gas flow passage 33. Then, the controller 60 calculates impedance of the fuel cell 20 based on the voltage and the current detected by the voltage sensor 71 and the current sensor 72 in the reference state and stores the calculated value as the reference value $\alpha$. As the reference value storage unit 61, an EEPROM or the like can be employed.

The controller 60 has a measured value calculation unit 62 which calculates a measured value $\beta$ of impedance based on a voltage of a plurality of cell groups constituting the fuel cell 20 and a current of the fuel cell 20 in a normal operation (a state where the fuel cell system 10 is operating in a state other than the reference state and) of the fuel cell system 10. In the normal operation of the fuel cell system 10, fuel gas is supplied from the fuel gas supply source 41 to the anode electrode of the fuel cell 20 through the fuel gas flow passage 43, and oxidant gas is supplied to the cathode electrode of the fuel cell 20 through the oxidant gas flow passage 33, whereby electric power generation is performed. At this time, electric power (required electric power) to be derived from the fuel cell 20 is calculated by the controller 60, and fuel gas and oxidant gas are supplied into the fuel cell 20 in an amount according to the amount of generated electric power. The controller 60 calculates impedance (measured value $\beta$) of the fuel cell 20 based on the voltage and the current detected by the voltage sensor 71 and the current sensor 72. in the normal operation.

The controller 60 has a corrected value calculation unit 63 which calculates a corrected value $\gamma$ of impedance by correcting the measured value $\beta$ of impedance calculated in the normal operation based on the reference value $\alpha$ of impedance calculated in the reference state. The corrected value calculation unit 63 in this embodiment calculates the corrected value $\gamma$ by adding a value obtained by subtracting the reference value $\alpha$ from a nominal value $\alpha_0$ of impedance to the measured value $\beta$. That is, the corrected value $\gamma$ is calculated by Expression "$\gamma=\beta+(\alpha_0-\alpha)$". The nominal value $\alpha_0$ is an impedance value which is assumed in design in a state where hydrogen is not deficient. For example, at this time, a current is 1 A/cm$^2$, and a voltage is 0.8 V. In contrast, the reference value $\alpha$ is an impedance value of the fuel cell 20 in a case where the reference state is actually created, and an output voltage at this time is not necessarily constant (for example, 0.8 to 1.2 V).

The controller 60 has a determination unit 64 which determines that hydrogen deficiency occurs in a case where the corrected value $\gamma$ of impedance exceeds predetermined threshold. The threshold used herein can be appropriately set according to protection requirements of the fuel cell 20.

Figure 3:
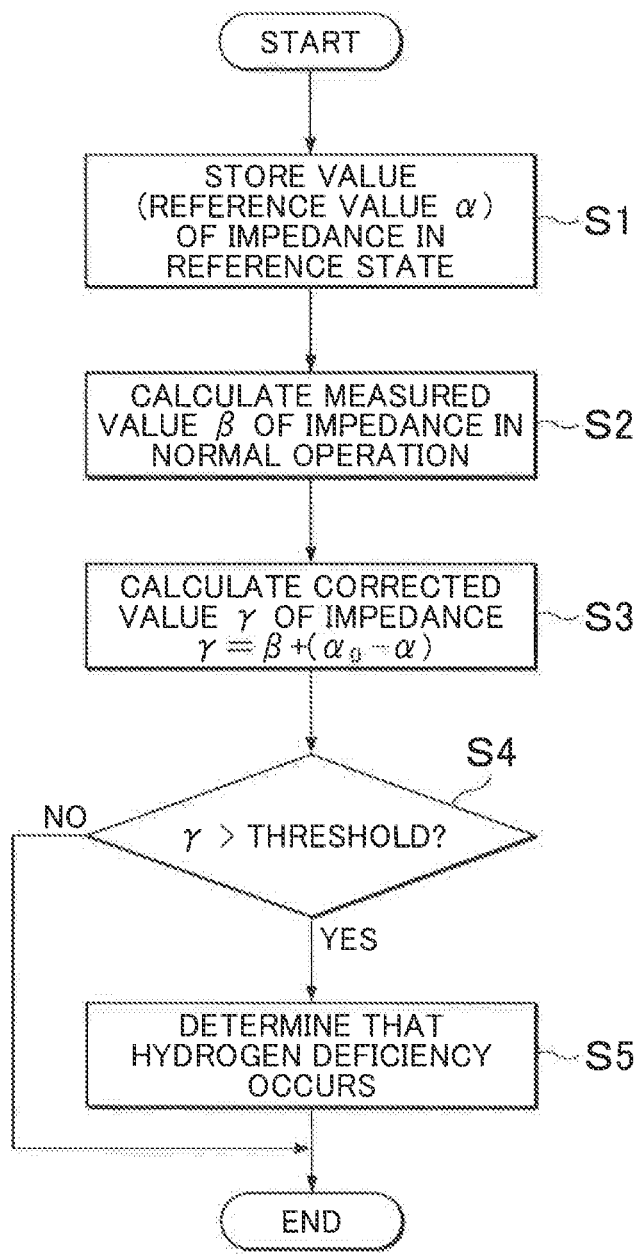
FIG. 3 is a flowchart illustrating a method of determining hydrogen deficiency of the fuel cell system according to the embodiment of the disclosure.

Next, a method of determining hydrogen deficiency of the fuel cell system 10 according to this embodiment will be described referring to the flowchart of FIG. 3.

First, the controller 60 of the fuel cell system 10 stores, as the reference value $\alpha$, an impedance value in a state (reference state) where hydrogen-off gas is discharged from the fuel cell 20 and hydrogen vas and oxidant gas are supplied (reference value storage step: S1). Next, the controller 60 calculates the measured value $\beta$ of impedance based on the voltage of a plurality of cell groups of the fuel cell 20 and the current of the fuel cell 20 in the normal operation of the fuel cell system 10 (measured value calculation step: S2).

Next, the controller 60 calculates the corrected value $\gamma$ of impedance by correcting the measured value $\beta$ calculated in the measured value calculation step S2 based on the reference value $\alpha$ stored in the reference value storage step S (corrected value calculation step: S3). At this time, the controller 60 calculates the corrected value $\gamma$ of impedance using the calculation expression "$\gamma=\beta+(\alpha_0-\alpha)$" described above. Subsequently, the controller 60 compares the corrected value $\gamma$ calculated in the corrected value calculation step S3 with the predetermined threshold (comparison step: S4), and determines that hydrogen deficiency occurs in a case where the corrected value $\gamma$ exceeds the threshold (determination step: S5). In a case where it is determined that hydrogen deficiency occurs, the controller 60 may give notification of the occurrence of hydrogen deficiency to a user by sound, an image, or the like using a predetermined display unit.

In the controller 60 according to the embodiment described above, since it is possible to determine the presence or absence of hydrogen deficiency using impedance, it is possible to increase the number of cells to be monitored simultaneously. Furthermore, it is possible to determine whether or not hydrogen deficiency occurs by storing, as the reference value $\alpha$, the impedance value in a state where hydrogen deficiency does not occur (a state where hydrogen-off gas is discharged from the fuel cell 20 and hydrogen gas and oxidant gas are supplied) and comparing the corrected value $\gamma$ obtained by correcting the measured value of impedance using the reference value $\alpha$ with the predetermined threshold. For this reason, it is possible to reduce a measurement error (an offset error depending on an individual) due to an increase in measurement range. Therefore, it is possible to increase the number of cells to be monitored simultaneously without causing degradation of measurement accuracy.

In this embodiment, although an example where the corrected value $\gamma$ calculated using the nominal value $\alpha_0$ of impedance is employed has been described, the corrected value is not limited thereto. For example, a corrected value $\gamma'$ ($=\beta-\alpha$) calculated by simply subtracting the reference value $\alpha$ from the measured value $\beta$ of impedance may be employed and it may be determined whether or not hydrogen deficiency occurs by comparing the corrected value $\gamma'$ with a new threshold (for example, a threshold set in consideration of the nominal value $\alpha_0$).

In this embodiment, although an example where the measured value $\beta$ is corrected using the impedance value (reference value $\alpha$) in the reference state where hydrogen deficiency does not occur has been described, the measured value $\beta$ may be corrected with reference to other parameters. For example, variation of a measurement system at the time of shipment may be measured, a correction map created based on the measurement result may be stored in a storage unit (for example, EEPROM), and the measured value $\beta$ may be corrected with reference to the correction map.

In this embodiment, although the "fuel cell vehicle" has been illustrated as a moving object, the fuel cell system according to the disclosure may be mounted in various moving objects (robot, ship, airplane, and the like) other than the fuel cell vehicle.

The disclosure is not limited to the above-described embodiment, and design modifications to the embodiment, which will be made by those skilled in the art as appropriate, are also included in the scope of the disclosure as long as the modifications have the features of the disclosure. That is, the respective elements in the above-described embodiment and the arrangement, materials, conditions, shapes, sizes, and the like thereof are not limited to those illustrated and may be modified as appropriate. In addition, the respective elements in the above-described embodiment can be combined as long as such combination is technically possible, and such combination is also included in the scope of the disclosure as long as such combination includes the features of the disclosure.

What is claimed is:

1. A method of determining hydrogen deficiency of a fuel cell having a plurality of cell groups, the method comprising:
    storing, by a reference value storage unit of a controller, an impedance value as an impedance reference value in a state where hydrogen-off gas is discharged from the fuel cell and hydrogen gas and oxidant gas are supplied to the fuel cell;
    calculating, by a measured value calculation unit of the controller, a measured value of impedance based on a voltage of the cell groups and a current of the fuel cell;
    calculating, by a corrected calculation unit of the controller, a corrected value of impedance by correcting the impedance measured value based on the impedance reference value; and
    determining, by a determination unit of the controller, that hydrogen deficiency occurs in a case where the impedance corrected value exceeds an impedance predetermined threshold.

2. The method of determining hydrogen deficiency according to claim 1,
    wherein the impedance corrected value is calculated by adding an impedance value obtained by subtracting the impedance reference value from a nominal value of impedance to the impedance measured value.

3. A device for determining hydrogen deficiency of a fuel cell having a plurality of cell groups, the device comprising:
    a reference value storage unit of a controller configured to store an impedance value as an impedance reference value in a state where hydrogen-off gas is discharged from the fuel cell and hydrogen gas and oxidant gas are supplied to the fuel cell;

a measured value calculation unit of the controller configured to calculate a measured value of impedance based on a voltage of the cell groups and a current of the fuel cell;

a corrected value calculation unit of the controller configured to calculate a corrected value of impedance by correcting the measured value based on the reference value; and a determination unit of the controller configured to determine that hydrogen deficiency occurs in a case where the impedance corrected value exceeds an impedance predetermined threshold.

4. The device for determining hydrogen deficiency according to claim 3, wherein the impedance corrected value calculation unit is configured to calculate the impedance corrected value by adding an impedance value obtained by subtracting the impedance reference value from a nominal value of impedance to the impedance measured value.

5. A device for determining hydrogen deficiency of a fuel cell having a plurality of cell groups, the device comprising:

a controller that stores, as a reference value, an impedance value in a state where hydrogen-off gas is discharged from the fuel cell and hydrogen gas and oxidant gas are supplied, wherein the controller is programmed to calculate a measured value of impedance based on a voltage of the cell groups and a current of the fuel cell, to calculate a corrected value of impedance by correcting the measured value based on the reference value, and to determine that hydrogen deficiency occurs in a case where the corrected value exceeds a predetermined threshold.

* * * * *